United States Patent
Figgins et al.

(10) Patent No.: US 11,497,169 B2
(45) Date of Patent: Nov. 15, 2022

(54) AGRICULTURAL VEHICLE WITH ADJUSTABLE PICKUP

(71) Applicant: CNH Industrial America LLC, New Holland, PA (US)

(72) Inventors: Ryan M. Figgins, New Holland, PA (US); David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 311 days.

(21) Appl. No.: 16/803,097

(22) Filed: Feb. 27, 2020

(65) Prior Publication Data

US 2021/0267127 A1 Sep. 2, 2021

(51) Int. Cl.
*A01D 89/00* (2006.01)
*A01F 15/07* (2006.01)

(52) U.S. Cl.
CPC ............ *A01D 89/002* (2013.01); *A01F 15/07* (2013.01)

(58) Field of Classification Search
CPC .. A01D 89/002; A01D 89/004; A01D 89/006; A01D 41/1278; A01F 15/07; A01F 15/0825; A01B 79/005
See application file for complete search history.

(56) References Cited

U.S. PATENT DOCUMENTS

| | | |
|---|---|---|
| 4,800,711 A | 1/1989 | Hurlburt et al. |
| 5,261,216 A | 11/1993 | Schumacher, II et al. |
| 6,421,990 B1 * | 7/2002 | Ohlemeyer ........ G01N 21/3563 356/328 |
| 7,222,479 B2 | 5/2007 | Stahl |
| 2016/0088800 A1 * | 3/2016 | Lang .................. A01F 15/0825 56/10.2 R |
| 2021/0176918 A1 * | 6/2021 | Franzen ............... A01B 79/005 |
| 2022/0030774 A1 * | 2/2022 | Pedroni ................... A01F 15/10 |

FOREIGN PATENT DOCUMENTS

| | | | | |
|---|---|---|---|---|
| AT | 006708 U1 | * | 1/2013 | ........... A01D 89/004 |
| CN | 106856852 A | * | 6/2017 | ........... A01D 89/006 |
| DE | 202005020779 U1 | * | 11/2006 | ........... A01D 89/004 |
| DE | 202008008710 U1 | * | 10/2008 | ........... A01D 89/002 |
| DE | 102008001779 A1 | * | 11/2009 | ........... A01D 89/002 |
| DE | 102011002875 A1 | * | 7/2012 | ........... A01D 89/004 |
| DE | 102011117385 A1 | * | 5/2013 | ........... A01D 89/008 |

(Continued)

OTHER PUBLICATIONS

Extended European Search Report for EP Application No. 21159368.6 dated Jul. 12, 2021 (seven pages).

*Primary Examiner* — Arpad Fabian-Kovacs
(74) *Attorney, Agent, or Firm* — Peter Zacharias; Patrick Sheldrake

(57) ABSTRACT

A feeding assembly for an agricultural vehicle includes: a frame; a rotatable auger supported by the frame and including at least one flighting; and a pickup assembly including a rotatable pickup reel and a plurality of tines rotatably carried by the pickup reel about a rotation axis, the tines being configured to pickup and convey crop material to the auger during rotation of the pickup reel. The pickup reel is movable relative to the auger such that movement of the pickup reel adjusts a distance between the rotation axis and the at least one flighting of the auger.

17 Claims, 6 Drawing Sheets

(56) References Cited

FOREIGN PATENT DOCUMENTS

| EP | 1741330 A1 | | 1/2007 | | |
|---|---|---|---|---|---|
| EP | 1757182 A1 | * | 2/2007 | ........... | A01D 89/004 |
| EP | 2067399 B1 | * | 4/2016 | ........... | A01D 89/004 |
| EP | 2725889 B1 | * | 3/2017 | ............. | A01F 15/00 |
| EP | 3461323 A1 | * | 4/2019 | ............. | A01F 15/07 |
| GB | 1 376 831 A | | 12/1974 | | |
| GB | 2245471 A | * | 1/1992 | ............. | A01D 41/14 |
| WO | WO-2013096959 A2 | * | 6/2013 | ............. | A01F 15/07 |

* cited by examiner

AGRICULTURAL VEHICLE WITH ADJUSTABLE PICKUP

BACKGROUND OF THE INVENTION

The present invention pertains to agricultural vehicles and, more specifically, to agricultural vehicles with a pickup for feeding crop material into the vehicle.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

What is needed in the art is a way to increase the baling capacity of balers while reducing the risk of crop damage.

SUMMARY OF THE INVENTION

Exemplary embodiments provided according to the present disclosure include a movable pickup reel that can be moved to adjust a distance between a rotation axis of the pickup reel and at least one flighting of an auger.

In some exemplary embodiments provided in accordance with the present disclosure, a feeding assembly for an agricultural vehicle includes: a frame; a rotatable auger supported by the frame and including at least one flighting; and a pickup assembly including a rotatable pickup reel and a plurality of tines rotatably carried by the pickup reel about a rotation axis, the tines being configured to pickup and convey crop material to the auger during rotation of the pickup reel. The pickup reel is movable relative to the auger such that movement of the pickup reel adjusts a distance between the rotation axis and the at least one flighting of the auger.

In some exemplary embodiments provided in accordance with the present disclosure, an agricultural vehicle includes: a chassis; a rotatable auger carried by the chassis and including at least one flighting; and a pickup assembly including a rotatable pickup reel and a plurality of tines rotatably carried by the pickup reel about a rotation axis, the tines being configured to pickup and convey crop material to the auger during rotation of the pickup reel. The pickup reel is movable relative to the auger such that movement of the pickup reel adjusts a distance between the rotation axis and the at least one flighting of the auger.

One possible advantage that may be realized by exemplary embodiments provided according to the present disclosure is that adjusting the distance between the rotation axis and the flighting(s) can be based on crop and/or harvesting conditions to reduce the risks of damaging crops and creating stagnant zones.

Another possible advantage that may be realized by exemplary embodiments provided according to the present disclosure is that the pickup reel can be moved in a variety of ways that do not interfere with normal crop flow.

Yet another possible advantage that may be realized by exemplary embodiments provided according to the present disclosure is that the pickup reel can be fully retracted when no new crop is being picked up to clean out any stagnant zones that may have developed during operation.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
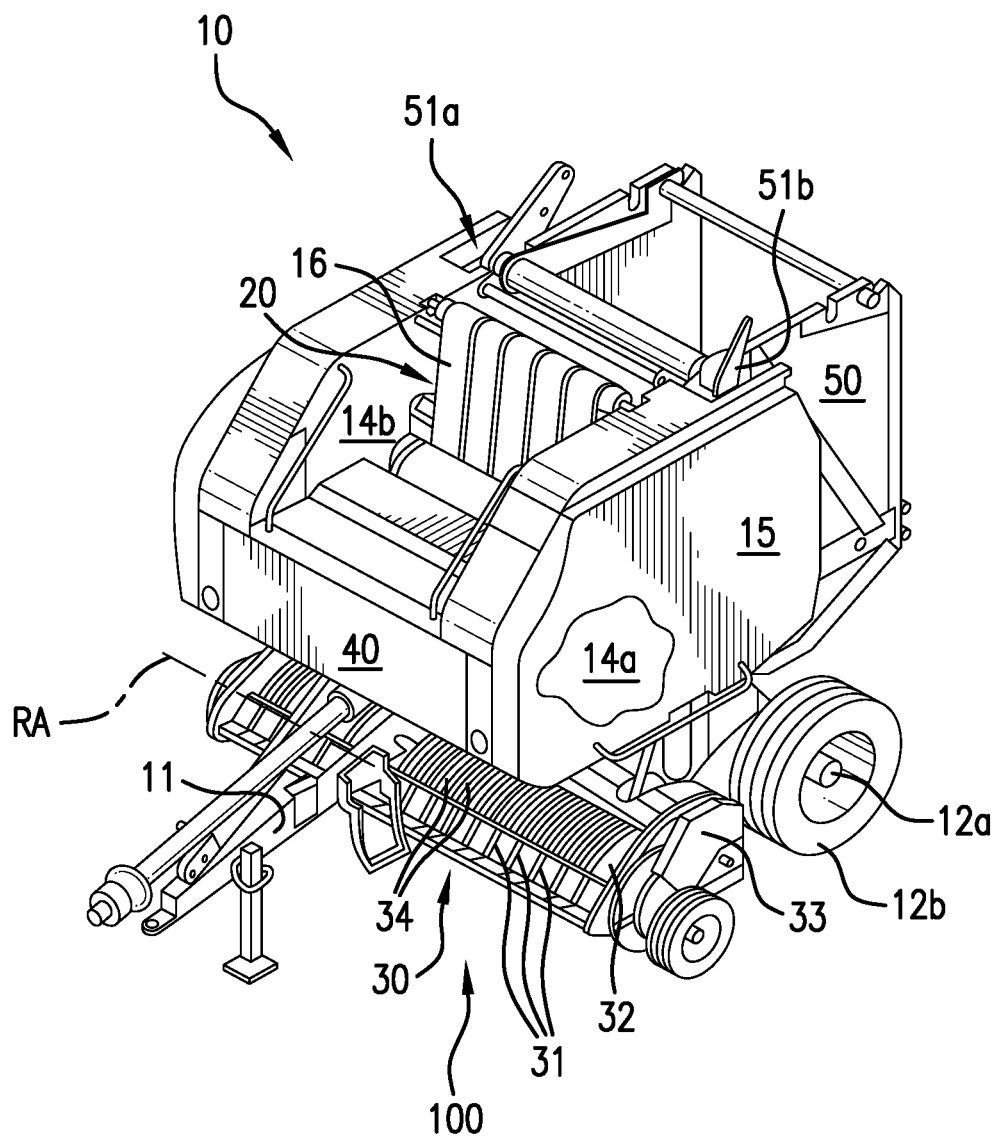
FIG. 1 illustrates a perspective view of an exemplary embodiment of an agricultural baler including a feeding assembly, provided in accordance with the present disclosure.

Referring now to the drawings, and more particularly to FIG. 1, an exemplary embodiment of an agricultural vehicle, shown in the form of a round baler 10, is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively forming a bale-forming chamber 20. Cut crop material is picked up by a feeding assembly 100 that includes a transverse pickup reel 30 that is rotatable about a rotation axis RA and rotatably carries a plurality of tines 31. While the pickup reel 30 is illustrated as directly coupling to the tines 31 to rotatably carry the tines 31, in some embodiments the pickup reel 30 is a wheel or other rotating element that is indirectly coupled to the tines 31 by, e.g., a belt or other element that the pickup reel 30 rotates to rotatably carry the tines 31. As the pickup reel 30 rotates the tines 31, the tines 31 pickup and convey crop material toward an auger 32, which moves the crop material so the crop material can be fed to the bale chamber 20 where it is formed into a cylindrically shaped bale by a series of conveyor belts 16. The pickup reel 30 and the tines 31 differ from, for example, reels of a combine harvester in that the pickup reel 30 and tines 31 tend to pickup, i.e., lift, crop material away from the ground toward the bale chamber 20, whereas reels of a combine harvester tend to force crop material downward toward a cutter bar. The auger 32 is supported by a frame 33 of the feeding assembly 100, which can be a part of the chassis or separate from the chassis. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. It should be appreciated that while the agricultural vehicle 10 is illustrated and described as a round baler, in some embodiments the agricultural vehicle 10 is configured as a different kind of baler, such as a square baler, or different kind of vehicle, such as a forage harvester or a merger.

In known feeding assemblies that pickup crop material, the distance between the pickup reel, as defined at the rotation axis, and the auger is fixed. While the fixed distance between the pickup reel and the auger may be well-suited for certain crop conditions and/or characteristics, such as long-stranded crops, the distance may not be optimal for different crop conditions and/or characteristics, such as short-stranded crops. When collecting short-stranded crops, for example, the distance between the pickup reel and the auger may be so great that the crop material is not properly fed to the auger by the tines, which can create a stagnant zone where there is no crop movement. On the other hand, when collecting long-stranded crops the distance may be so small that the crop is damaged during the transfer between the tines and the auger. The damage may be due to the change in direction of the crop material as it is transferred between the tines and the auger; increasing the distance between the tines and the auger can mitigate or prevent such damage. Many known agricultural vehicles try to address issues like these by using a distance between the pickup reel and the auger that provides modest performance for a wide variety of crops and crop conditions, but such attempts have failed to provide an agricultural vehicle that is optimized for a variety of specific crop conditions and/or characteristics.

Figure 2:
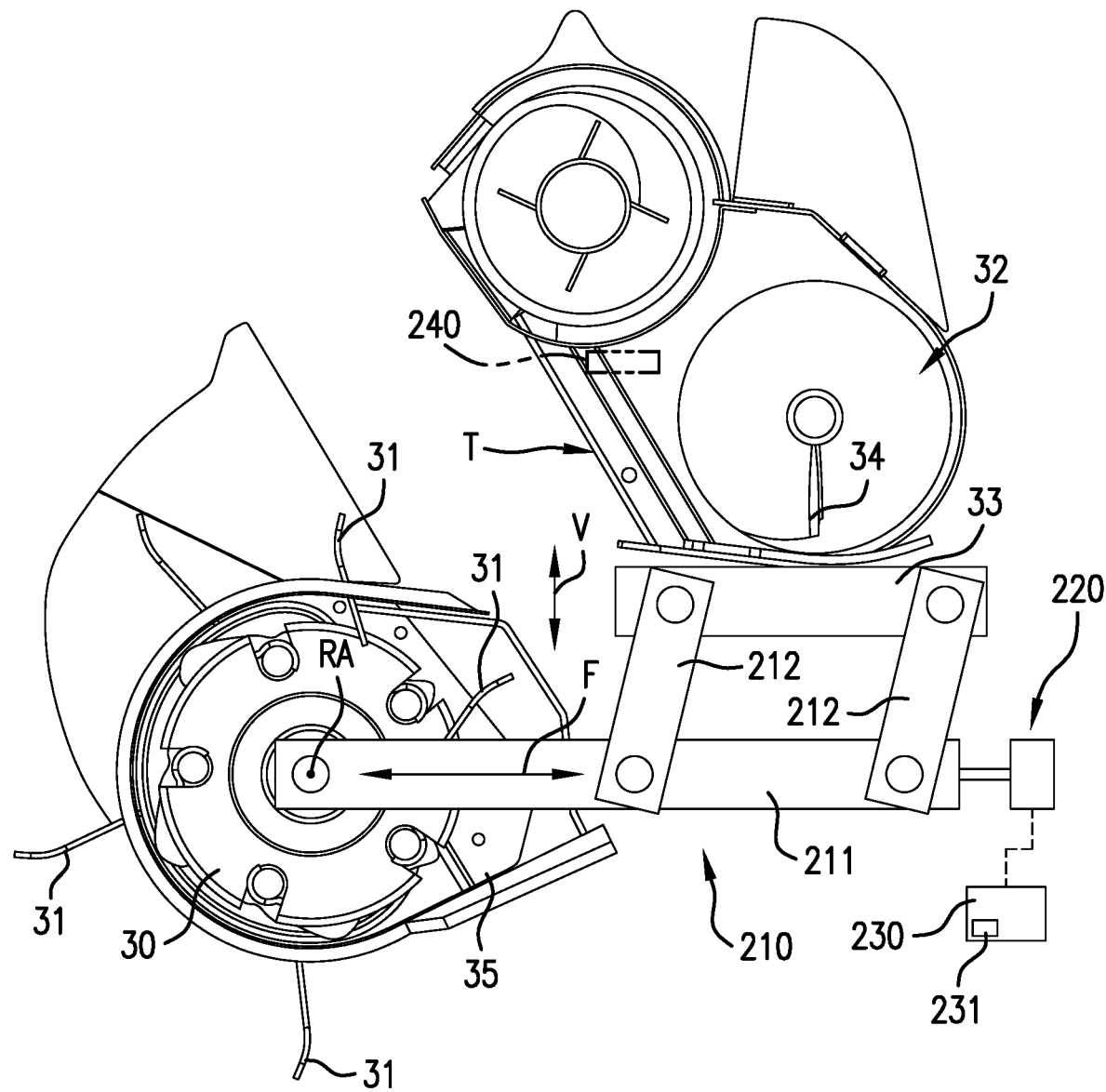
FIG. 2 illustrates a side view of the feeding assembly of FIG. 1 with a pickup reel in a first position.
Figure 3:
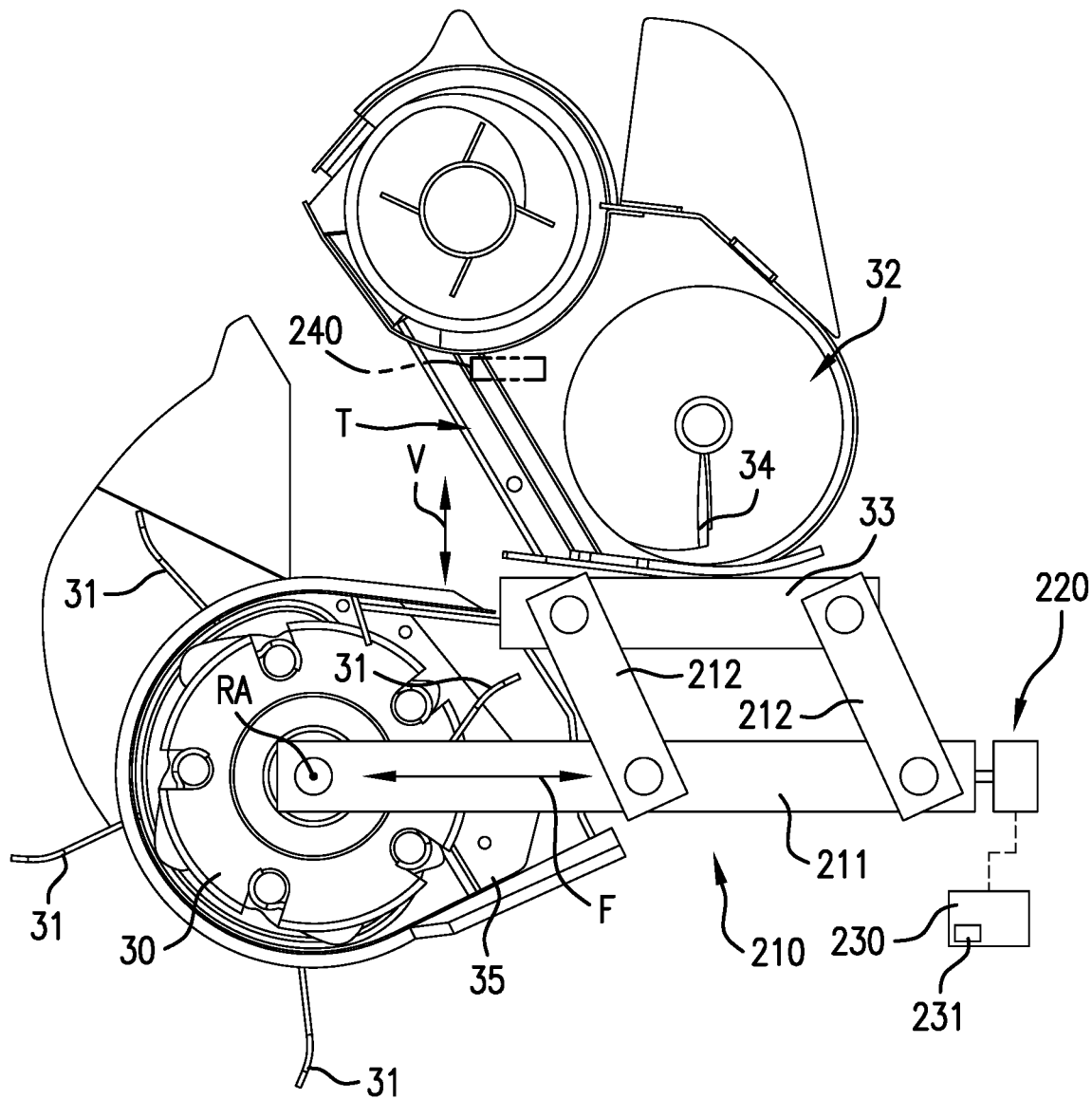
FIG. 3 illustrates a side view of the feeding assembly of FIGS. 1-2 after moving the pickup reel to a second position.

To address some of the previously described issues, and referring now to FIGS. 2-3 as well, the pickup reel 30 provided according to the present disclosure is movable relative to the auger 32 such that movement of the pickup reel 30 adjusts a distance between the rotation axis RA of the pickup reel 30 and at least one flighting 34 of the auger 32. By moving the pickup reel 30, the distance between the pickup reel 30 and the auger 32 can be adjusted to improve collection of crop material based on the crop conditions and/or characteristics. The pickup reel 30 may be moved, for example, from a first position (illustrated in FIG. 2) to a second position (illustrated in FIG. 3) where the pickup reel 30 defines a shorter distance to the auger 32 than the first position. Moving the pickup reel 30 to the second position may be desired, for example, when the agricultural vehicle 10 is being used to collect short-stranded crops. When collecting longer stranded crops, the pickup reel 30 may be moved back to the first position or a different position, if desired.

To move the pickup reel 30, the feeding assembly 100 may include a linkage 210 that movably couples the pickup reel 30 to the frame 33 supporting the auger 32. The linkage 210 may include an arm 211 that is coupled to the pickup reel 30 and one or more linkage bars, with two linkage bars 212 being illustrated in FIGS. 2-3, coupled to the arm 211 and the frame 33 to couple the arm 211 and the frame 33 together. The arm 211 may be coupled to a pickup frame 35 that supports the pickup reel 30 and is movably coupled to the frame 33 by the linkage 210. In some embodiments, the linkage bars 212 are pivotably coupled to the frame 33 to pivotably couple the pickup reel 30 (via the pickup frame 35 and the arm 211) to the frame 33. When the pickup reel 30 is pivotably coupled to the frame 33 via connection to the linkage bars 212 and the arm 211, the pickup reel 30 may be moved in both a vertical direction V and a fore-aft direction F. The linkage 210 is illustrated in a side view in FIGS. 2-3, and in some embodiments the linkage 210 includes another arm coupled to the pickup reel 30 and one or more additional linkage bars coupled to the other arm on the opposite side of the feeding assembly 100 so the pickup reel 30 is stabilized and moved by the linkage 210 on opposite sides.

To move the pickup reel 30, a pickup actuator 220 may be coupled to the linkage 210, such as to the arm 211. Extension and retraction of the pickup actuator 220 causes movement of the coupled arm 211, and a corresponding movement of the pickup reel 30. The pickup actuator 220 may be mounted, for example, to the frame 33. A controller 230 may be provided that is operatively coupled to the pickup actuator 220 and configured to output an adjustment signal to the pickup actuator 220 to cause the pickup actuator 220 to adjust the distance between the rotation axis RA and the at least one flighting 34 of the auger 32, as will be described further herein. It should be appreciated that while the agricultural vehicle 10 is illustrated as including the pickup actuator 220 to cause movement of the pickup reel 30, the pickup reel 30 can also be manually adjusted without using a separate actuator by, for example, an operator or a service technician.

Figure 4:
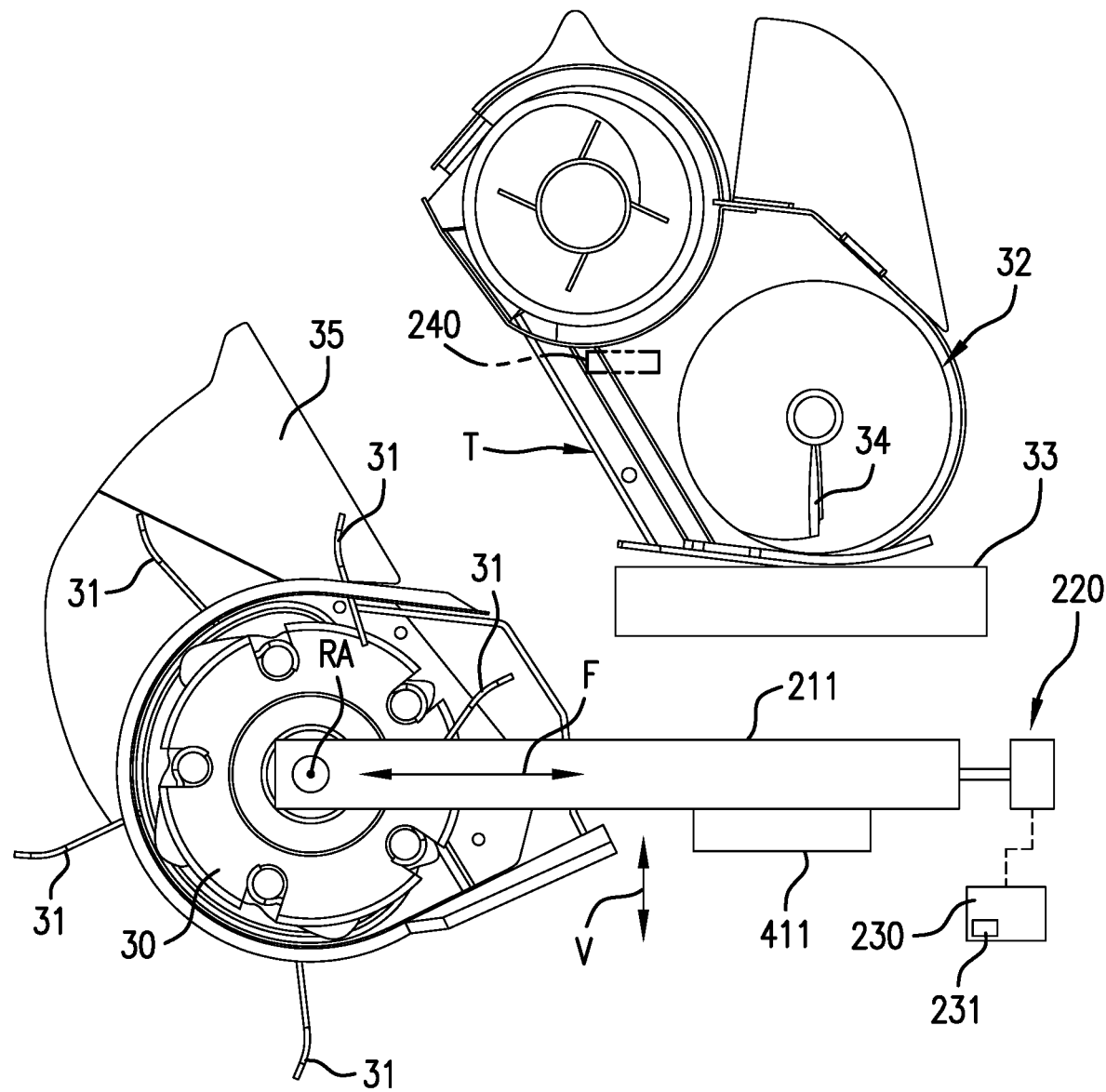
FIG. 4 illustrates a side view of another exemplary embodiment of a feeding assembly with a linkage that does not include pivot bars, provided in accordance with the present disclosure.

In some exemplary embodiments, and referring now to FIG. 4, the pickup reel 30 is linearly movably coupled to the frame 33 via direct connection of the arm 211 to the pickup actuator 220, i.e., the linkage bars 212 may be omitted. In such a configuration, the pickup reel 30 is movable in the fore-aft direction F with minimal, if any, movement in the vertical direction V. The arm 211 may be supported on its bottom by a brace 411 to reduce the risk of the pickup reel 30 descending vertically during operation. In some embodiments, the brace 411 is selectively movable in the vertical direction V so the height of the pickup reel 30 can also be adjusted.

From the foregoing, it should be appreciated that the feeding assembly 100 provided according to the present disclosure includes a movable pickup reel 30 that can be moved to adjust the distance between the pickup reel 30 and the auger 32. By adjusting the distance between the pickup reel 30 and the auger 32, various adjustments can be made to better suit collected crop conditions and/or characteristics. For example, the distance can be easily and quickly adjusted when transitioning from collecting long-stranded crops to collecting short-stranded crops, or vice versa. Thus, the feeding assembly 100 provided according to the present disclosure can efficiently collect crop material with a variety of different characteristics and conditions without requiring, for example, re-mounting of the pickup reel 30.

An operator may control the distance between the pickup reel 30 and the auger 32 in a variety of ways. In some embodiments, the previously described controller 230 is used to adjust the distance by controlling selective activation of the pickup actuator 220 using output adjustment signals. Outputting the adjustment signals may be manually controlled by an operator or automatically sent by the controller 230, as described further herein.

Figure 5:
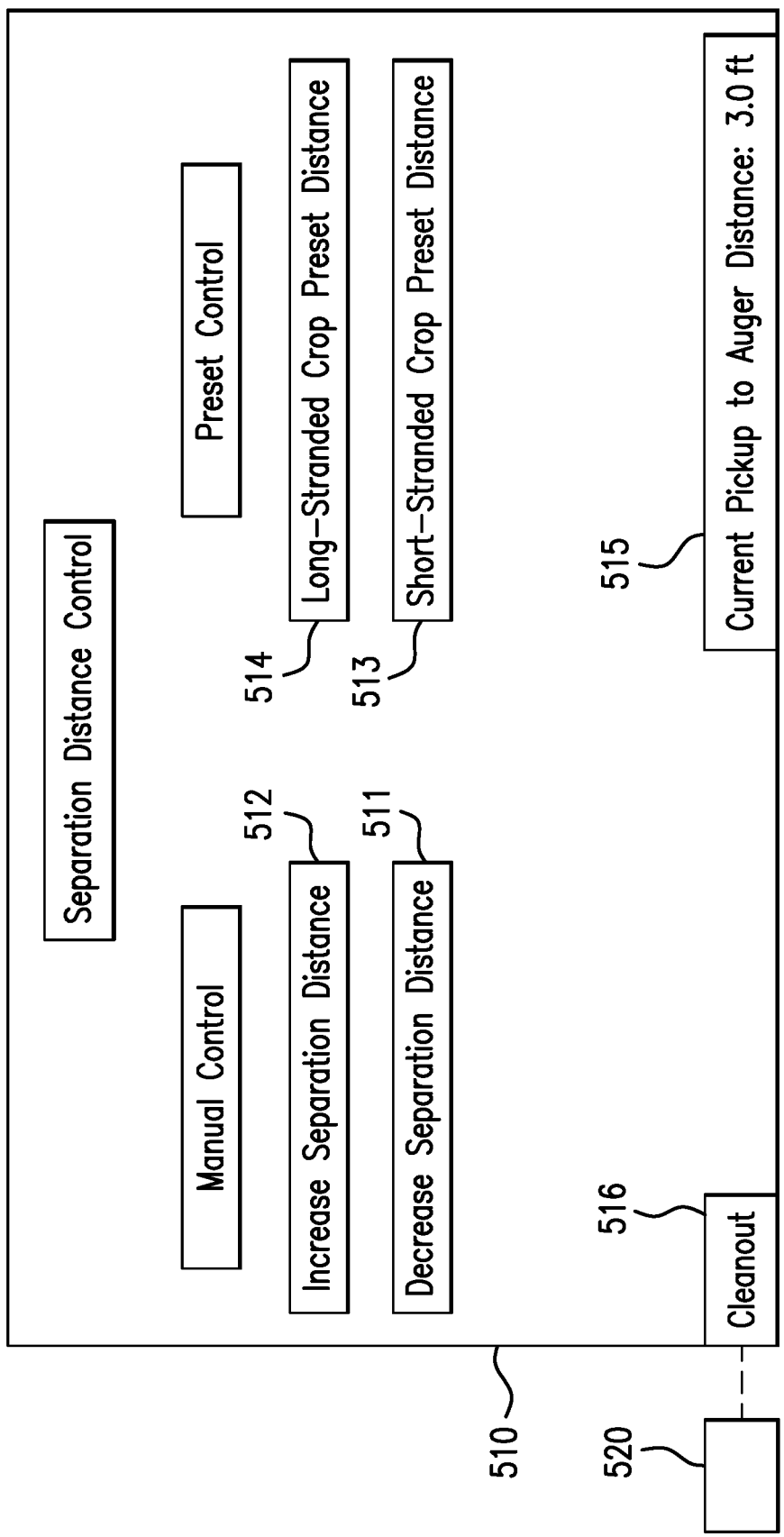
FIG. 5 illustrates a display presenting various icons for controlling the feeding assembly of FIGS. 1-4.

In some embodiments, and referring now to FIG. 5, the controller 230 is operatively coupled to a display 510, which may be part of a towing vehicle that is towing the agricultural vehicle 10. The controller 230 may be operatively coupled to the display 510 via an operative coupling to a vehicle controller 520 that is operatively coupled to the display 510, i.e., the controller 230 of the agricultural vehicle 10 is indirectly coupled to the display 510 of the towing vehicle. Such a coupling may be, for example, through a CANBUS network, as is known.

As illustrated in FIG. 5, the display 510 can be controlled to present a number of adjustment icons 511, 512, 513, 514 for controlling the distance between the pickup reel 30 and the auger 32. Some of the adjustment icons, such as the adjustment icons 511, 512, can be presented to allow manual control of the distance by the operator. The operator selecting the adjustment icon 511, for example, can cause the controller 230 to output an adjustment signal to the pickup actuator 220 that causes the pickup actuator 220 to retract, reducing the distance between the pickup reel 30 and the auger 32. In contrast, selecting the adjustment icon 512 can cause the controller 230 to output an adjustment signal to the pickup actuator 220 that causes the pickup actuator 220 to extend, increasing the distance between the pickup reel 30 and the auger 32. The display 510 may also present a current distance icon 515 to assist an operator in manually controlling the distance between the pickup reel 30 and the auger 32. The current distance may be determined, for example, using signals from a position sensor associated with the pickup actuator 220.

Alternatively, the operator may wish for the controller 230 to automatically set the distance between the pickup reel 30 and the auger 32. When automatic control is desired, the adjustment icons 513, 514 may be selected to cause the controller 230 to automatically output adjustment signals to the pickup actuator 220 and adjust the distance between the pickup reel 30 and the auger 32. Each of the adjustment icons 513, 514 may correspond to specific crop characteristics. For example, the adjustment icon 513 may correspond to short-stranded crops while the adjustment icon 514 may correspond to long-stranded crops. When the operator selects the adjustment icon 513, for example, a first selection signal may be output to the controller 230 that causes the controller 230 to lookup a first defined distance value in a lookup table stored in a memory 231 of the controller 230. Based on the defined distance value, and in some cases the current distance as well, the controller 230 may then output the appropriate adjustment signal to the pickup actuator 220 to adjust the distance between the pickup reel 30 and the auger 32. If the operator selects the adjustment icon 514 instead, a second selection signal may be output to the controller 230 that causes the controller 230 to lookup a second defined distance value in the lookup table and then output the appropriate adjustment signal to the pickup actuator 220. The defined distance values may be entered in the memory 231 by the operator and/or at the factory; in some embodiments, the defined distance values may be edited as desired. In some embodiments, the operator may manually input one or more crop characteristics, prompting the controller 230 to look up the defined distance for the input characteristic(s). In some embodiments, the controller 230 is configured to compare a current distance of the pickup reel 30 from the auger 32 to the defined distance value and determine an adjustment distance value before outputting the adjustment signal to the pickup actuator 220. In some embodiments, the controller 230 is configured to allow automatic control of the distance via selection of either of the adjustment icons 513, 514 followed by subsequent manual control via selection of either of the adjustment icons 511, 512. It should thus be appreciated that the controller 230 may be configured in a variety of ways that allow an operator to adjust the distance between the pickup reel 30 and the auger 32 from a towing vehicle, such as a tractor.

In some embodiments, the controller 230 may be configured to automatically output adjustment signals to the pickup actuator 220 without any prompting from an operator. For example, the controller 230 may be configured to receive yield data, which may be in the form of a yield data map, about a field. The yield data may be generated while previously handling the crop material, e.g., during mowing and/or raking. The yield data can represent the density of crops at any point in the field, which the controller 230 may analyze to determine what the distance between the pickup reel 30 and the auger 32 should be at various locations in the field. The controller 230 may then output one or more adjustment signals to the pickup actuator 220 during collection to adjust the distance between the pickup reel 30 and the auger 32 according to the determined distance(s). In such embodiments, the controller 230 may be configured to receive one or more positioning signals from, for example, a global positioning satellite (GPS) transponder to determine the current location of the agricultural vehicle 10 and output the adjustment signal(s) at the appropriate location in the field.

The controller 230 may be configured to determine at least one crop characteristic of collected crop material and select the adjustment distance based at least partially on the determined crop characteristic(s). In some embodiments, the yield data also includes one or more characteristics of the crop at various locations in the field so the controller 230 has additional data to analyze for determining what the distance between the pickup reel 30 and the auger 32 should be. Exemplary characteristics include, but are not limited to, average length of cut crop, average density of cut crop, type of crop material, and moisture content of cut crop material. One or more of these characteristics may be determined by the controller 230 when determining the adjustment distance. The controller 230 may select the adjustment distance based on the determined crop characteristic(s) and, for example, a lookup table stored in the memory 231 with preset distance values for various crop characteristics. It should be appreciated that the number and types of characteristics analyzed by the controller 230 to determine the adjustment distance can be varied in many different ways, and the previously described characteristics are only a few examples of possible characteristics.

In some embodiments, and referring again to FIGS. 2-4, the agricultural vehicle 10 includes one or more optical sensors 240, such as a camera, directed at a transition region T between the tines 31 of the pickup reel 30 and the flighting(s) 34 of the auger 32. While the agricultural vehicle 10 is illustrated with only one optical sensor 240 in the form of a camera, it should be appreciated that the number and type of optical sensors 240 may be adjusted as desired. The optical sensor 240 may be configured to output optical signals to the controller 230, which can analyze the optical signals to determine if crop material flow in the transition region T is erratic or smooth. Various techniques for analyzing optical signals to determine crop material flow patterns are known, and any suitable technique may be utilized according to the present disclosure. For example, images of moving crop material particles in the transition region T may be captured by the optical sensor(s) 240 and evaluated by the controller 230 to determine the velocity and/or direction of the moving particles. The controller 230 may determine whether the crop material flow in the transition region T is erratic or smooth based on the distribution of the velocities and/or directions of the moving particles.

In most cases, erratic crop material flow occurs when the distance between the pickup reel 30 and the auger 32 is too low and can be due to drastic changes in crop material flow direction at the transition between the tines 31 and the flighting(s) 34. Erratic crop flow can damage crop material and also be inefficient compared to smooth flow, which may be laminar flow. To avoid erratic crop flow, the controller 230 may be configured to analyze the optical signals from the optical sensor 240 and determine if crop material flow in the transition region T is smooth or erratic. If the crop flow is determined to be erratic, the controller 230 may output an adjustment signal to the pickup actuator 220 to cause extension (or in some embodiments, retraction) of the pickup actuator 220 to increase the distance between the pickup reel 30 and the auger 32. The controller 230 may be configured to re-analyze the optical signals following outputting the adjustment signal and output a subsequent adjustment signal to increase the distance between the pickup reel 30 and the auger 32 if the controller 230 determines that the crop material flow in the transition region T is still erratic. The controller 230 may be configured to analyze the optical signals and, if needed, output adjustment signals to the pickup actuator 220 to adjust the distance until the controller 230 no longer detects erratic crop material flow in the transition region T.

In some embodiments, the controller 230 is configured to output an erratic flow warning signal to the display 510 so the display 510 presents a warning icon indicating that the crop material flow in the transition region T is erratic. The warning icon may also present text advising an operator to, for example, reduce the speed of the agricultural vehicle 10 in order to try and cause the crop material flow to become smoother and less erratic. The erratic flow warning signal may be output by the controller 230 when, for example, the pickup reel 30 is at a minimum clearance position where the pickup actuator 220 cannot move the pickup reel 30 to get closer to the auger 32 or a maximum clearance position where the pickup actuator 220 cannot move the pickup reel 30 to get further from the auger 32. The ability of the pickup actuator 220 to alter the nature of the crop material flow in the transition region T is limited when the pickup reel 30 is in the minimum clearance position or the maximum clearance position, in which case the operator may need to adjust one or more other operating parameters, e.g., the vehicle speed, as previously described, to further smooth the crop material flow.

In some embodiments, the controller 230 may be configured to institute a cleanout procedure to reduce or eliminate stagnant zones. It has been found that stagnant zones may form during collection of crop material, as well as when no crop material is being collected due to crop material buildup not being moved by incoming crop material. To clean out the stagnant zone(s), the controller 230 may be configured to output a cleanout signal to the pickup actuator 220 that causes the pickup actuator 220 to move the pickup reel 30 to a defined cleanout position where the distance between the pickup reel 30 and the auger 32 is sufficiently small to push any stagnant crop material to the auger 32 with the tines 31. The defined cleanout position may be, for example, a position of the pickup reel 30 where the distance between the pickup reel 30 and the auger 32 is a minimum allowed distance that avoids damaging contact between components of the feeding assembly 100. The controller 230 may be configured to output the cleanout signal to the pickup actuator 220 in a variety of ways. In some embodiments, the controller 230 may be configured to output the cleanout signal when an operator selects a cleanout icon 516 (illustrated in FIG. 5) on the display 510. Alternatively, or in addition, the controller 230 may be configured to output the cleanout signal when the controller 230 determines that there is little, if any, additional crop material being conveyed by the tines 31. The controller 230 may be configured to determine that there is little additional crop material being conveyed by, for example, analyzing optical signals from the optical sensor 240. The controller 230 may also be configured to output a return signal to the pickup actuator 220 to return the pickup reel 30 to the previous position it was in immediately before the cleanout procedure was initiated. It should thus be appreciated that the cleanout procedure may be instituted in a variety of ways to reduce, if not eliminate, stagnant zones in the feeding assembly 100.

From the foregoing, it should be appreciated that the distance between the pickup reel 30 and the auger 32 can be adjusted in a variety of ways. The operator can adjust the distance manually and/or the controller 230 may be configured to automatically adjust the distance by controlling the pickup actuator 220. While various ways of adjusting the distance between the pickup reel 30 and the auger 32 have been previously described, the distance can be adjusted in other ways according to the present disclosure.

Figure 6:
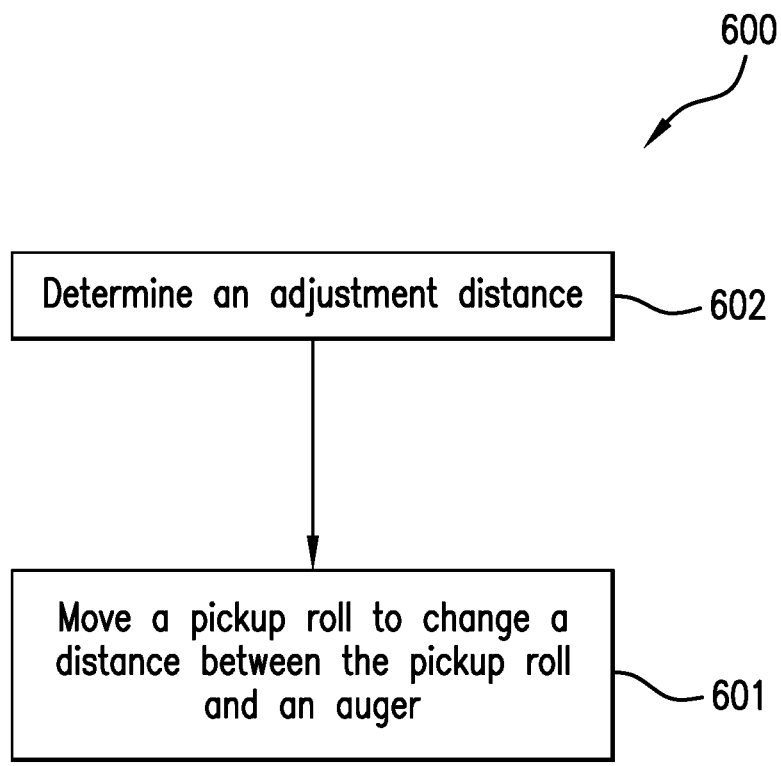
FIG. 6 is a flow chart illustrating an exemplary embodiment of a method provided according to the present disclosure.

Referring now to FIG. 6, an exemplary embodiment of a method 600 of adjusting crop material feeding into an agricultural vehicle, such as the agricultural vehicle 10, is illustrated. The method 600 includes moving 601 the pickup reel 30 to change the distance between the rotation axis RA of the pickup reel 30 and the flighting(s) 34 of the auger 32. Moving 601 the pickup reel 30 may include, for example, the controller 230 outputting the adjustment signal to the pickup actuator 220 to extend or retract the pickup actuator 220 and move 601 the pickup reel 30, as previously described. Prior to moving 601 of the pickup reel 30, by the controller 230 or otherwise, the controller 230 may determine 602 an adjustment distance and output the adjustment signal based on the determined adjustment distance. Determining 602 the adjustment distance may include, for example, determining at least one crop characteristic of collected crop material and selecting the adjustment distance based at least partially on the determined at least one crop characteristic, as previously described.

It is to be understood that some or all of the steps of the method 600 are performed by the controller 230 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art.

Thus, any of the functionality performed by the controller 230 described herein, such as the method 600, is implemented in software code or instructions which are tangibly stored on a tangible computer readable medium such as the memory 231 of the controller 230. The controller 230 loads the software code or instructions via a direct interface with the computer readable medium or via a wired and/or wireless network. Upon loading and executing such software code or instructions by the controller 230, the controller 230 may perform any of the functionality of the controller 230 described herein, including any steps of the method 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A feeding assembly for an agricultural vehicle, comprising:
 a frame;
 a rotatable auger supported by the frame and comprising at least one fighting;
 a pickup assembly comprising a rotatable pickup reel and a plurality of tines rotatably carried by the pickup reel about a rotation axis, the tines being configured to pickup and convey crop material to the auger during rotation of the pickup reel, the pickup reel being movable relative to the auger such that movement of the pickup reel adjusts a distance between the rotation axis and the at least one fighting of the auger; and
 a linkage movably coupling the pickup reel to the frame, the linkage comprising an arm coupled to the pickup reel and at least one linkage bar having one end coupled to the arm and an opposite end pivotably coupled to the frame.

2. The feeding assembly of claim 1, wherein the pickup reel is linearly movably coupled to the frame.

3. The feeding assembly of claim 2, further comprising a pickup actuator coupled to the pickup reel and configured to linearly move the pickup reel relative to the frame.

4. The feeding assembly of claim 1, wherein the pickup assembly comprises a pickup frame supporting the pickup reel and movably coupled to the frame.

5. The feeding assembly of claim 1, further comprising a pickup actuator coupled to the pickup reel and a controller operably coupled to the pickup actuator, the controller being configured to output an adjustment signal to the pickup actuator that causes the pickup actuator to adjust the distance between the rotation axis and the at least one fighting of the auger.

6. The feeding assembly of claim 5, wherein the controller is configured to determine an adjustment distance and output the adjustment signal based on the determined adjustment distance.

7. The feeding assembly of claim 6, wherein determining the adjustment distance comprises determining at least one crop characteristic of collected crop material and selecting the adjustment distance based at least partially on the determined at least one crop characteristic.

8. The feeding assembly of claim 1, further comprising a pickup actuator directly coupled to an end of the arm and configured to move the arm.

9. The feeding assembly of claim 8, wherein movement of the arm by the pickup actuator causes corresponding pivoting of the at least one linkage bar relative to the frame.

10. An agricultural vehicle, comprising:
 a chassis;
 a rotatable auger carried by the chassis and comprising at least one fighting;
 a frame supporting the auger;
 a pickup assembly comprising a rotatable pickup reel and a plurality of tines rotatably carried by the pickup reel about a rotation axis, the tines being configured to pickup and convey crop material to the auger during rotation of the pickup reel, the pickup reel being movable relative to the auger such that movement of the pickup reel adjusts a distance between the rotation axis and the at least one fighting of the auger; and
 a linkage movably coupling the pickup reel to the frame, the linkage comprising an arm coupled to the pickup reel and at least one linkage bar having one end coupled to the arm and an opposite end pivotably coupled to the frame.

11. The agricultural vehicle of claim 10, wherein the pickup reel is linearly movably coupled to the frame.

12. The agricultural vehicle of claim 11, further comprising a pickup actuator coupled to the pickup reel and configured to linearly move the pickup reel relative to the frame.

13. The agricultural vehicle of claim 10, wherein the pickup assembly comprises a pickup frame supporting the pickup reel and movably coupled to the chassis.

14. The agricultural vehicle of claim 10, wherein the agricultural vehicle is an agricultural baler comprising a bale chamber configured receive crop material from the pickup assembly and form picked up crop material into a bale.

15. The agricultural vehicle of claim 10, further comprising a pickup actuator coupled to the pickup reel and a controller operably coupled to the pickup actuator, the controller being configured to output an adjustment signal to the pickup actuator that causes the pickup actuator to adjust the distance between the rotation axis and the at least one flighting of the auger.

16. The agricultural vehicle of claim 10, further comprising a pickup actuator directly coupled to an end of the arm and configured to move the arm.

17. The agricultural vehicle of claim 16, wherein movement of the arm by the pickup actuator causes corresponding pivoting of the at least one linkage bar relative to the frame.

* * * * *